United States Patent Office 3,494,966
Patented Feb. 10, 1970

3,494,966
o-SULFUR BRIDGED PHENOLIC POLYOLS
Emil J. Geering, Grand Island, and George B. Stratton, Lewiston, N.Y., assignors to Hooker Chemical Corporation, Niagara Falls, N.Y., a corporation of New York
No Drawing. Continuation-in-part of application Ser. No. 597,214, Nov. 28, 1966. This application Sept. 25, 1967, Ser. No. 671,538
Int. Cl. C07c *149/38*
U.S. Cl. 260—608                                          7 Claims

ABSTRACT OF THE DISCLOSURE

This application describes a method for preparing (1) phenolic polyol in which hydroxy-substituted phenolic rings are directly linked by sulfur linkages of preferably less than about 2 sulfur atoms, in which at least 60 percent of all

bonds of said phenol-sulfide groups are ortho to at least one hydroxy group per hydroxy-substituted aromatic ring, (2) the ortho-substituted mercaptophenol composition from the phenolic polyol produced by the above method, at least 60 percent of the mercaptophenols being ortho-substituted, (3) aliphatic polyol derivatives of the phenolic polyol, (4) polyurethanes from the aliphatic polyols, (5) epoxide compositions prepared from the phenolic polyol, and (6) polyester compositions prepared from the aliphatic polyols.

---

This is a continuation-in-part of application Ser. No. 597,214, filed on Nov. 28, 1966, now abandoned.

This invention relates to a novel method for preparing a particular phenolic polyol, a process for preparing a novel aliphatic polyol derived from the phenolic polyol, a novel process for preparing an o-mercaptophenol, the discovery of a novel epoxy derivative of the phenolic polyol, a polyester derivative of the aliphatic polyol and a novel polyurethane derivative of the aliphatic polyol.

Prior to this invention, known processes which employ sulfur chloride as an initial reactant for the production of phenol sulfides in which phenol rings are linked by one or more sulfur atoms, involved higher manufacturing costs than the process of this invention and were accompanied by certain problems. For example, sulfur chloride is the initial reactant in a known process, and may be more expensive than the sulfur reactant employed in the process of this invention. In conjunction with this, the condensation of phenol and sulfur monochloride or sulfur dichloride is accompanied by the formation of hydrogen chloride as a by-product. A process for preparing phenol-sulfides which includes the condensation of phenol and a sulfur chloride must also include, therefore, costly steps involving special materials of construction for handling this corrosive gas, unlike the disclosed process of this invention.

The prior art process employing sulfur chloride has a disadvantage of requiring an extra step, a sulfur chlorination step to produce sulfur chlorides as well as a step for disposing a corrosive by-product gas, hydrogen chloride.

The employment of sulfur halide as an initial reactant, to be reacted with the phenol, obtains a polyol which includes chlorine atoms attached to the aromatic ring and/or attached to the sulfur atom; the chloride compounds may be corrosive. The phenolic intermediate utilized in this invention is produced by a process which has advantages over processes used to produce phenolic intermediates derived from a sulfur halide. The overall process of producing the phenolic sulfides of this invention which are derived from the base-catalyzed reaction of phenol and sulfur incorporates these advantages which include, for example, the lack of corrosive reagents or by-products, and lower manufacturing costs.

The reports of several authors concerning the relative positions of the sulfur and hydroxyl groups on the aromatic rings of these compounds have not been in agreement. L. Haitinger in 1883, Monatsh. Chem. 4, 165–175, obtained a phenol sulfide by heating a mixture of sodium phenate and sulfur. Apparently a minor portion of the acidified reaction mixture was collected as a steam distillate which contained the ortho isomer of mercaptophenol, for after neutralization and exposure to the air the distillate deposited a salt of o,o'-dithiodiphenol, the oxidation product of o-mercaptophenol. In a more recent reference by C. Leferrer and C. Desgrez, Compt. rend. 198, 1432–4, 1791–3 (1934), both p,p'-thiodiphenol and p,p'-dithiodiphenol were prepared by heating a mixture of phenol, sulfur, glycerol and sodium carbonate. Thus, one could not predict from a knowledge of the chemical literature the substitution pattern or products derived from sulfur and phenol under basic conditions.

The structure of phenol sulfides produced according to the present invention differs significantly from phenol sulfides produced by sulfur-chloride processes of the prior art. The phenol sulfides prepared from phenol and sulfur chloride are, to a great degree, para substituted. This is demonstrated by several references in the literature in which the preparation of bis(p-hydroxyphenyl) sulfides by this route was reported. See, for example, Z. S. Ariyan and L. A. Wiles, J. Chem. Soc., 1962, 3876. Another difference between the two condensation products of this invention and of sulfur halide is the number of sulfur atoms per polysulfide bond. The predominant bond is the monosulfide when the reagent is sulfur monochloride or sulfur dichloride (French Patent 1,369,616). When the condensation is effected with elemental sulfur, the number of sulfur atoms can range from one to about seven. When prepared under the conditions of this invention, however, the phenol sulfides have an average of less than two sulfur atoms per linkage.

The o-mercaptophenol and o-mercaptoalkylphenols are useful multifunctional chemicals that have been obtainable only with difficulty. They are not offered commercially, at the date of the application as they are not listed in the publication, "Chem Sources," Directories Publishing Co., New York, New York, 1965, or in catalogues of chemical supply houses. They are not commercial chemicals because of the lack of a suitable technique for their manufacture at reasonable costs.

An o-mercaptophenol was first prepared by Haitinger as described above. A similar method of K. W. Palmer, U.S. 2,004,728, June 11, 1935, consists in heating a mixture of sodium phenate and sodium disulfide. The product was isolated by solvent extraction of the acidified mixture. No yields were recorded by either author and in the latter publication no physical properties other than its description as a greenish oil were given. These procedures were described by D. Greenwood and H. A. Stevenson, J. Chem. Soc., 1953, 1514–1519, as giving poor yields of a product that was difficult to purify. Their method of choice was a modification of a procedure described by P. Friedlander and F. Mauthner, Zeit. Farb. Text. Ind., 3,333–337 (1904) which, in turn, was based on the work of R. Leuckart, J. Prakt. Chem., 41, 179–224 (1890), whereby o-hydroxyphenyl ethyl xanthate, from o-hydroxybenzene diazonium chloride and potassium ethyl xanthate, is converted to o-mercaptophenol. The prior art is in sharp contrast, therefore, to the present invention. Here, o-mercaptophenol of high purity is produced from low-cost starting materials by a straight-forward procedure and in high yield.

K. W. Palmer disclosed in British Patent No. 381,237 a method of producing mercaptophenols by (a) a process of reacting phenol or chlorophenol and sodium sulfide, and (b) other processes of producing mercaptophenols from a di-sodium salt of p,p'-thiodiphenol.

It is an object of this invention to produce an aromatic, preferably phenolic, polyol having sulfur-linkages substituted at the ortho-positions of at least about 60% of all hydroxy-phenyl rings of the phenolic polyol.

Another object is to obtain a process for the production of high yields of said ortho-substituted aromatic polyol.

Another object is to produce said phenolic polyol having a low concentration of di- and/or polythio linkages, and a high concentration of mono-sulfide linkages.

Another object is to avoid undesirable and complicating problems of known methods for the production of phenolic polyols.

Another object is a novel process for producing an aliphatic polyol.

Another object is a novel process for producing epoxy derivatives of said aromatic polyol, and the novel epoxy derivatives thereby produced.

Another object is a novel process for producing a polyester from said aliphatic polyol.

Another object is a novel process for producing a novel polyurethane from said aliphatic polyol.

Another object is a novel process for producing an orthomercaptophenol composition.

Other objects become apparent from the above and following disclosure.

Description of the invention

An object of this invention is obtained by the employment of elemental sulfur in reaction with a hydroxy-substituted aromatic reactant, with a basic catalyst being employed in an amount ranging from at least a catalytic amount up to about 15%, based on the number of moles of said phenolic reactant, said reactant having a molar ratio to said sulfur of from about 0.8 up to about 4, at a temperature ranging from about 120° C. up to about 200° C. for a period of from at least about one hour to about 24 or more hours provided that said reaction is carried to a degree of completion (1) at which the minimum number of moles evolved of hydrogen sulfide at least exceeds about 33% of the number of moles of sulfur charged into said reaction, and (2) at which said reaction is carried (a) to completion sufficiently to produce a reaction product comprising an aromatic polyol in which each pair of adjacent hydroxy-substituted aromatic rings (such as phenyl rings) have at least one sulfur-linkage and (b) to completion sufficiently to produce said reaction product in which a preferred phenolic polyol is of the structural Formula I:

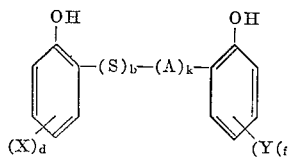

in which A is a phenolic polyol of the formula:

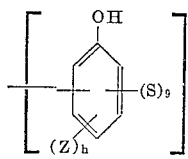

in which X, Y and Z are each a first member selected from the group consisting of halogen, alkyl, alkoxy and alkene of one to about 18 carbon atoms, alicyclic, aryl, aryloxy, and hydroxy, in which $b$ and $g$ are each at least one up to about 7 (up to about 4 or 5), provided that the average number of sulfur atoms per sulfur-linkage for the sum of all sulfur atoms of $b+(k$ times $g)$ equals less than two sulfur atoms per linkage, in which $k$ ranges from zero up to about 10, in which each of $d$ and $f$ each range from zero to four and $h$ from zero to three, provided that when any of $d$, $f$, or $k$ is more than one, the several members may be different, and provided that at least about 60% of the

bonds of all the sulfur-linked hydroxy-phenyl rings of the phenolic polyol are ortho to at least one hydroxy group per hydroxy-phenyl ring, and in which said reaction is substantially in the absence of a sulfur halide. The phenol sulfide molecules may thereafter be reduced to mercaptophenol comprising at least about 60% of orthomercaptophenol. However, total mercaptophenol yield will be substantially low because the average number of sulfur atoms per sulfur linkage is less than two, and the reduction can occur only when the number of sulfurs per linkage is two or more.

As discussed above, the ortho-substituted phenolic polyols of this invention typically have at least one sulfur and an average of less than two sulfurs per linkage and therefore typically have a low sulfur content.

In the preferred embodiments of the above process of this invention, the preferred ranges are: a reaction temperature of at least about 140° C. up to not more than about 190° C.; a preferred catalyst level of from a catalytic amount up to substantially less than 2.0%, preferably up to 0.2% (on a molar basis of the phenol) is employed to obtain more than about 90% of the ortho-phenol sulfide of this invention, or alternatively a preferred catalyst level of from about 10% up to about 15% to obtain more than about 25% of the para-phenol sulfide; sodium hydroxide, potassium hydroxide, sodium phenate, sodium sulfide, and sodium polysulfide are the preferred catalysts; a phenolic-reactant/sulfur molar ratio is at least about 1.2 up to about 3 in the most preferred embodiment; the period of reaction preferably is at least about 5 to about 24 hours at about 140° C. to about 180° C. and at less than 2% of catalyst; and the phenolic reactant is phenol or alkyl phenol; and X, Y and Z are preferably each non-halogen substituents. However, for the about 10% to the about 15% catalyst level, the preferred period of reaction is about one hour to about ten hours.

At the 2% level of catalyst, more than 80% of the phenolic-polyol reaction product is ortho-content, and at a preferred 0.2% or less, more than 90% is ortho-content. The selectivity of the reaction of phenol and sulfur in giving ortho-substituted product is dependent on the concentration of basic catalyst; as the catalyst concentration is reduced, the proportion of ortho-substituted product increases.

The phenolic polyol (or phenol sulfide) intermediate composition formed by the novel process of this invention of reacting elemental sulfur with a phenolic reactant, is termed a bis(o-hydroxyphenyl) sulfide when merely a single unit is involved, and is termed a poly(o-hydroxyphenylene)sulfide or oligo(o-hydroxyphenylene)sulfide when several units are involved. The bis(o-hydroxyphenyl)sulfide is also termed thiodiphenol, the thio- referring to a single sulfur.

Included as part of the broad process of this invention is the conversion of the above phenolic polyols to aliphatic polyols. This object is obtained by the above-described process further including an additional reaction of the aromatic, preferably phenolic, polyol-reaction product, with, for example, an alkylene oxide, such as ethylene oxide, or a lactone such as β-propiolactone, to produce an aliphatic polyol in which the hydrogen of substantially all hydroxy-substituents at positions ortho to at least one sulfur-linkage substituent per phenolic ring are replaced by a polyether or polyester substituent of the Formula II:

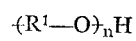

in which n is from one to about twenty or more, and in which R¹ is a member selected from the group consisting of a linear alkylene, a carbonyl-containing aliphatic radical, and alkyl-substituted, aryl-substituted, alkoxy-substituted, aryloxy-substituted, acyloxy-substituted, and halogen-substituted forms of said members. Typical aliphatic polyols include:

(1) 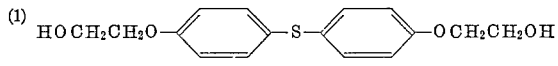

2,2'-[thiobis(p-phenyleneoxy)] diethanol (2) 
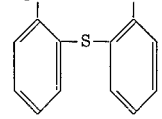

2,2'-[thiobis(o-phenyleneoxyethyleneoxy)] diethanol and (3) 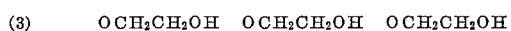

2,6-bis(2-hydroxyethyleneoxyphenylthio)2-hydroxyethyleneoxybenzene or both, in rubber such as butadiene-styrene or butadiene-acrylonitrile, for example.

The polymers produced derived from either the aromatic polyols or the aliphatic polyols of this invention are useful in the preparation of novel foamed plastics, adhesives, binders, laminates, coatings, and potting compounds.

The polyurethane foams are useful as insulating materials in both cold and hot applications, such as in domestic refrigerators and refrigerated vehicles, as well as in insulation for hot water or steam pipes, valves, and the like. The foam products are also useful as core materials between skins such as aluminum or steel or plastics of various types. The resulting sandwich-type structures are well suited for use in such diverse fields as the construction and insulation industries.

The two condensation products of a sulfur chloride and phenol, on one hand, and of sulfur and phenol when reacted under the conditions of this invention, on the other hand, differ in the isomer distribution.

The phenol —S₂Cl₂ reaction gives predominantly para substitution. After two molecules of phenol have been coupled at the para positions, the only available reactive sites remaining are ortho to the hydroxy group, and molecules having three or more phenol rings will have, of course, some ortho substitution.

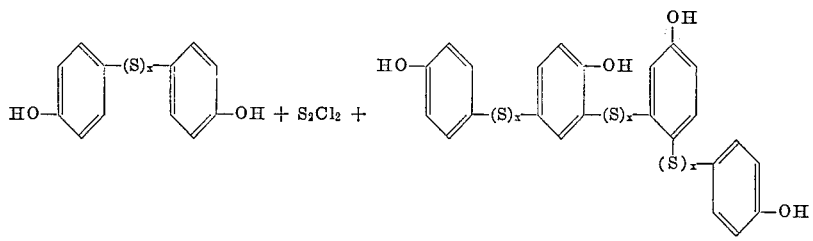

Other objects of this invention are obtained by the conversion of the above phenolic polyols to novel epoxy derivatives by reaction in the presence of a strong base of the polyol with a halohydrin reactant such as epichlorohydrin, epibromohydrin, 1,2 - epoxy-3-chlorocyclohexane, 1-chloro-2,3-epoxybutane, for example, whereby the hydroxyl groups are converted to glycidyl ether groups.

Typical epoxy derivatives include the diglycidyl ether of p,p'-thiobisphenol, and the polyglycidyl ethers of the higher molecular weight phenol sulfides of this invention. The epoxy derivatives will also include polymeric structures derived from the reaction of a glycidyl ether and a phenol sulfide.

Other objects of this invention are obtained by the reaction of (a) an anhydride or other ester-forming group or (b) a polyisocyanate, with the above aliphatic polyols represented by Formula II above, to produce (a) a polyester, or (b) a polyurethane, respectively. Similarly, a dianhydride may be employed. The reaction with a polyisocyanate may be conducted in the presence of a foaming agent, whereby the product will be a polyurethane foam.

Thus the phenolic polyols of this invention are useful for conversion into epoxy resins and for the preparation of aliphatic polyols, and the aliphatic polyols are useful for the preparation of polyesters and polyurethanes.

Therefore, the aliphatic polyols of this invention typically include phenylene sulfides or polyphenylene sulfides substituted (preferably in positions ortho to the sulfur atoms) with hydroxy-terminated polyether or polyester groups.

The aromatic polyols of this invention may typically be employed as either a stabilizer or as a vulcanizing agent, wherein x averages less than two.

The maximum proportions (as percentages) of para substitution (assuming ortho plus para equals 100%) for phenol-sulfur chloride condensates containing two, three, six and eleven rings are 100, 75, 60 and 55, respectively. This series approaches 50% for a hypothetical polymer of infinite molecular weight. The phenol sulfides of this invention prepared in the presence of less than about 15 mole percent of a base catalyst, with respect to the phenolic reactant, are more than about 60% ortho-substituted.

When the phenol sulfide of this invention has at least two separate sulfur linkages, in a polymer having at least three phenolic rings, the entire polymer chain is substantially solely "ortho" such as when catalyst employed is less than about 0.2%, and may be typically represented as follows:

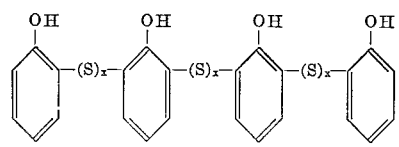

wherein x averages less than two.

However, at higher catalyst levels or also if rearrangement takes place to at least some degree at higher temperature, the typical structure may modify to become partially "para," such as follows, for example:

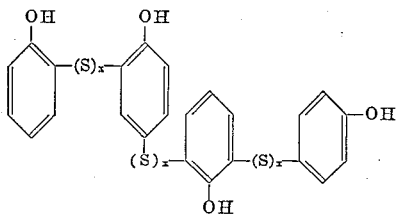

Examples of phenols which can be used in preparing the sulfur condensation products include phenol itself or substituted phenols having the following general formula:

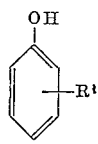

wherein R can be hydrogen, alkyl, alkoxy or alkene groups of 1 to 18 carbon atoms, alicyclic groups of 5 to 18 carbon atoms, or aromatic, aryloxy or aralkyl groups of 6 to 18 carbon atoms.

The phenols are characterized in that at least about 90 to 95 percent of the substituted phenols in the reaction mixture are unsubstituted in at least one ortho position of the phenol nucleus available for condensation reaction. Suitable substituted phenols include p-tertiary-butylphenol, p-isooctylphenol, p-vinylphenol, p-phenylphenol, p-benzylphenol, p-methoxyphenyl, p-cyclohexylphenol, p-nonylphenol, p-cumylphenol, p-chlorophenol, p-fluorophenol, p-bromophenol, as well as the corresonding ortho and meta derivatives such as meta-butylphenol and ortho-butylphenol, as well as mixtures thereof. Additional phenolic compounds include naphthols and polyhydric benzenes and naphthalenes, such as resorcinol, hydroquinone, catechol, dihydroxy naphthalene and phloroglucinol, also, compounds such as bis-phenols, bis-naphthols, bis-hydroxyphenyl ethers, and the like are contemplated herein.

By varying the ratio of phenol or aromatic alcohol to sulfur of the initial charge, the functionality and molecular weight of the phenolic product can be varied.

The base-catalyzed reaction between phenol and sulfur is affected by the activity and concentration of the catalyst, the temperature at which the reaction is conducted, the duration of the reaction (time), and the ratio of the reactants.

When, during the course of the reaction, half of the charged sulfur is converted into hydrogen sulfide and half into monosulfide bonds, the maximum extent of reaction is reached. Although all of the sulfur may have been converted into polysulfide bonds when about 33% of the sulfur has been evolved as hydrogen sulfide, it it critical that the reaction be continued whereby there will continue to be a hydrogen sulfide evolution until the polysulfide bonds are converted, with loss of sulfur— which reacts again with phenol or the phenolic substrate to monosulfide bonds.

In the following Table I of Examples III through IX, the extent of reaction, as measured by the quantity of hydrogen sulfide generated, is listed as percent reaction for each example.

Distillation is employed to remove at least a portion of the unreacted phenol from the reaction product. Distillation pressure is preferably in the range of 0.1 mm. Hg to atmospheric pressure or higher. If, because of insufficiently reduced pressure, the temperature of the distillation residue will approach, during the distillation, reaction temperature, and if further reaction is not desired, the reaction mixture should be neutralized, for example, with hydrochloric acid, prior to the distillation step.

The basic catalysts which may be employed for the initial condensation reaction include elemental alkali metals, alkali or alkaline earth hydroxides, primary, secondary and tertiary amines, salts of strong bases and weak acids or alcohols, such as sodium acetate, sodium benzoate, sodium methylate, sodium sulfhydrate, aluminum isopropoxide, sodium thiosulfate, sodium sulfide, sodium tetrasulfide, sodium thiocyanate, and the like.

Other typical suitable catalysts include sodium, potassium, lithium, calcium and barium hydroxides; methyl, dimethyl, triethyl, and tripropyl amines, and the like.

The reduction to the mercaptophenols can be effected by several well-known methods. These typically include the action of metals and acid (nascent hydrogen), catalytic hydrogenation, and chemical reduction using alkali metal sulfides, for example. The preferred process is by hydrogenation.

Alkali metal sulfides reduce disulfides according to the equation:

(1) $RSSR + 2Na_2S \rightarrow 2RSNa + Na_2S_2$

The present invention makes use of the reaction of sulfur present primarily as alkali or organic polysulfide, and caustic to generate the sodium sulfide required by the above equation.

(2) $Na_2S_2 + 1.5NaOH \rightarrow 1.5Na_2S + 0.25Na_2S_2O_3 + 0.75H_2O$

According to Equation 3, sodium hydroxide or other alkali or alkaline earth hydroxide is the sole reagent required to effect reduction of the bis(o-hydroxyphenyl) polysulfide.

(3) $RSS_xSR + 1.5(1+x)NaOH \rightarrow 2RSNa + 0.25(1+x)$
$Na_2S_2O_3 + 0.5(x-1)Na_2S + 0.75(1+x)H_2O$ In Equations 1 and 3 R is the o-hydroxyphenyl radical.

Hydrogenation catalysts typically include sulfides of various metals, such as $CoS_2$, $CoS_3$, $Co_2S_3$, $MoS_2$, $MoS_3$, $MoS_4$, and the like, nickel poly-sulfide, iron poly-sulfide, chromium poly-sulfide, tungsten poly-sulfide, copper poly-sulfide, silver poly-sulfide, lead poly-sulfide, palladium sulfides and platinum sulfides, for example.

The orthomercaptophenols may be employed, for example, for any conventional use for mercaptophenols in general, such as a chemical intermediate, a polymerization modifier, etc.

In one embodiment of the invention, the aromatic or phenolic polyol can be modified by oxidation of the sulfur atoms to sulfur oxide radicals, i.e., sulfoxide and/or sulfone radicals. It is again preferred that the phenyleneoxyalkanol radicals be joined by a single sulfur atom (i.e., an average of less than two sulfur atoms per linkage), or contain not more than 10 percent of polysulfide chains. Suitable oxidizing agents are hydrogen peroxide and the organic peroxides such as: acetyl peroxide, trichloroacetyl peroxide, benzoyl peroxide, tertiarybutyl peroxide, cumyl peroxide, peracetic acid, perbenzoic acid, cumene hydroperoxide, acetone peroxide, and the crude peroxide-containing mixtures obtainable by partial oxidation of terpenes, olefins, or alkyl aromatic hydrocarbons. The reaction with oxygen can, alternatively, be catalyzed by exposure to actinic light or by use of other non-peroxide catalysts such as azoisobutyronitrile, chlorine, activated carbon, manganese or cobalt naphthenates or other transition metal salts, ozone, or nitrogen oxides. Oxidation temperatures within the range of 30 to 150 degrees Centigrade can be employed. Reaction times generally in the range of 1 to 5 hours.

Catalysts for the hydroxyalkylation reactions with oxirane ring compounds are the alkali metals, alkali or alkaline earth hydroxides, primary, secondary, and tertiary amines or basic alkali salts. The preferred catalysts are the alkali metals, i.e., sodium and potassium. Other suitable catalysts include sodium, potassium, lithium, calcium, and barium hydroxides; methyl, dimethyl, triethyl, and tripropyl amines, and the like; and salts of strong bases and weak acids such as sodium acetate or sodium benzoate.

The hydroxyalkylation reaction is generally carried out temperatures in the range of 50 to 150 degrees centigrade, preferably at least 120 degrees, and preferably in the absence of solvents. It is preferred to maintain an inert gas atmosphere in the reaction zone, e.g., nitrogen, carbon dioxide, argon, and the like. It is preferred to employ at least about 1 mole of hydroxyalkylation agent per mole of phenolic hydroxyl so that the product contains substantially no free reactive phenolic groups (less than about 5 percent of phenolic hydroxyl group). The hydroxyl number of the condensation products of the invention can be adjusted by controlling the ether chain length. Likewise, the physical properties of the polyurethane compositions of the invention can be adjusted by controlling the ether chain lengths. Generally for rigid foams, up to about 10 moles of hydroxyalkylation agent are reacted per mole of phenolic hydroxyl. In the production of flexible foams, the desired ether chain length is dependent on the molecular weight of the condensation product, but will generally not exceed about 100 units of hydroxyalkylation agent per mole of phenolic hydroxyl, and usually does not exceed about 20 units per mole.

The aromatic or phenolic polyols of this invention are preferably converted to aliphatic polyols by reaction with compounds containing an oxirane ring as illustrated by the following Equation A.

(A) The addition of an epoxide—

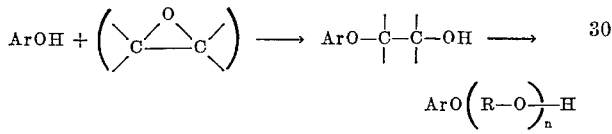

where R is alkylene, etc.

Mono-epoxides include ethylene oxide, propylene oxide, butylene oxide, cyclohexane oxide, styrene oxide, allyl glycidyl ether, glycidyl sorbate, methyl glycidyl ether, glycidyl methyl sulfone, glycidyl acrylate, glycidyl allyl phthalate, and the like. The preferred mono-epoxides are the mono-epoxide-substituted hydrocarbons, the mono-epoxide-substituted ethers, sulfides, sulfones and esters wherein the compounds contain 2 to 18 carbon atoms. Higher epoxides such as trimethylene oxide, tetramethylene oxide 1,4-epoxycyclohexane, 1,4-endoxodecalin, 2,2-bis(chloromethyl)-1,3-epoxypropane may also be used.

Examples of carbonyl-containing oxirane-type alkylating agents typically include 1,2-epoxy-3-pentanone, and 1,2-epoxy-3-heptanone.

Examples of alkyl, aryl, alkoxy, aryloxy, acyloxy, and halogen substituents to the —R$^1$— in the above-described aliphatic polyol, typically include methyl, decyl, ethoxy, dodecyloxy, phenoxy, naphthyl, a benzoyl radical, a naphthoyl radical, and chloro- or bromo- or fluoro- or iodo-organo radicals.

In the preferred process of this invention, in the initial reaction of the sulfur with the phenol, or phenolic-type compound, the reaction must be carried out in the presence of a minor amount of catalytic material, such as sodium hydroxide, ranging from about 0.05 percent up to about 0.2 percent by weight of the phenolic compound. By the employment of the basic material in critically substantially less than an equivalent amount of the sulfur, an unexpectedly high yield of ortho-polyol is produced. The difunctional or multifunctional phenolic product obtained by this reaction is reacted (oxyalkylated) with a compound such as an alkylene oxide, i.e., ethylene oxide, and the alkylene oxide is employed as a reactant in a ratio of about 1 to about 20 moles of the alkylene oxide per phenolic "OH" group in the difunctional phenol. In the oxyalkylation reaction, the sodium hydroxide, or other equivalent basic catalyst in the preferred embodiment, is employed in an amount less than about 0.2 percent by weight. This small quantity of catalyst advantageously can generally be left in the product as such, or as a salt thereof, without any adverse effect on the reaction product. Also, by the employment of merely a small quantity of catalyst, purification steps, such as washing or filtration, are unnecessary. Catalysts for the epoxide-addition reaction include the basic materials mentioned above which catalyze the phenol-sulfur reaction.

It is preferred that the catalyst be the same catalyst as that used in the initial condensation of sulfur and the phenolic reactant, so that no further catalyst need be added again for the second step.

As noted above, by varying the ratio of phenol to sulfur of the initial charge, the functionality and molecular weight of the phenolic polyol, and hence also of the phenol polyol aliphatic product, can be varied. Thus, one can obtain aliphatic polyols approaching a functionality of two as a minimum. The molecular weight and the viscosity can also be controlled by changing the quantity of ethylene oxide that is added to the phenolic product, i.e., the length of the oxide chain is varied.

Other methods of preparing the aliphatic polyols of this invention are illustrated by Equations B through D.

(B) The addition of a lactone—

(1) ArOH+(β-propiolactone)

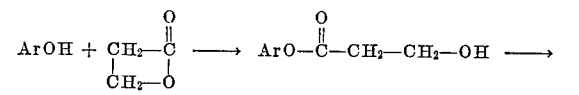

(2) ArOH+(γ-butyrolactone)

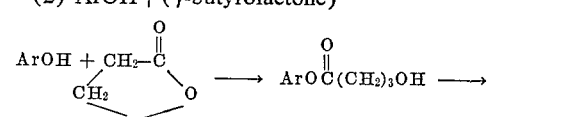

(3) (δ-valerolactone)

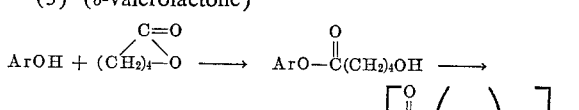

(4) (ε-caprolactone)

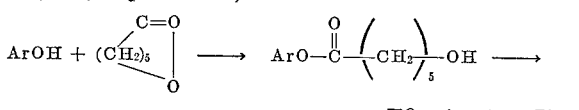

(C) The addition of ethylene carbonate—

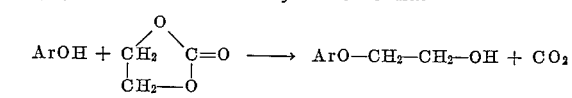

(D) The addition of ethylene sulfite—

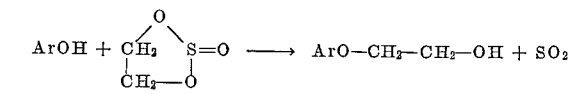

For any one of the lactone, or ethylene carbonate, or ethylene sulfite typical reactants, any one or more of hydrogen atoms thereof may, prior to the reaction, be replaced by a substituent selected from the group consisting of alkyl, aryl, halogen, alkoxy, and aryloxy.

Catalyst for the above lactone-addition, or ethylene carbonate-addition, or ethylene sulfite-addition reactions include the catalysts of the above epoxide-addition reaction and also include acid catalyst such as (a) Lewis acids such as boron trifluoride; (b) mineral acids such as sulfuric; and (c) strong organic acids such as p-toluene sulfonic acid. Again, it is preferred that the catalyst be the same as employed in the initial condensation reaction, for the lactone and carbonate and sulfite reactions; the preferred catalyst for the sulfite reaction is sodium phenate or alkali metal carbonates.

The aliphatic polyols are converted into polyesters by reacting the polyol with a polycarboxylic acid, the acyl halide thereof, the anhydride thereof, or the ester thereof. The polycarboxylic compounds can be aliphatic, cycloaliphatic, aromatic, or heterocyclic and either saturated or unsaturated. Among the polycarboxylic compounds which can be used are: aromatic acids such as phthalic acid; isophthalic acid; terephthalic acid; tetrachlorophthalic acid; aliphatic acids such as oxalic, maleic, fumaric, malonic, succinic, glutaric and adipic; 1,4-cyclo-hexadiene-5,6-dicarboxylic acid and the like. Additional polycarboxylic compounds which can be used to form the polyester are Diels–Alder adducts of hexahalocyclopentadiene and a polycarboxylic compound containing aliphatic carbon-to-carbon unsaturation, wherein the halogen is selected from the group consisting of chlorine, bromine, fluorine, and mixtures thereof, for example: 1,4,5,6,7,7-hexachlorobicyclo - (2.2.1) - 5 - heptene-2,3-dicarboxylic acid; 1,4,5,6-tetrachloro - 7,7 - difluorobicyclo-(2.2.1)-5-heptene-2,3-dicarboxylic acid; 1,4,5,6,7,7-hexabromobicyclo-(2.2.1)-5-heptene - 2,3 - dicarboxylic acid; 1,4,5,6-tetrabromo-7,7-difluorobicyclo-(2.2.1) - 5 - heptene-2,3-dicarboxylic acid; and the like. The corresponding acid anhydrides, acyl halides, and acid esters thereof are suitable. Mixtures of any of the above polycarboxylic compounds can be employed.

The novel ortho-substituted polyol-polyurethane compositions of the invention comprise the reaction products of an organic polyisocyanate with the foregoing condensation products. If a foamed product is desired, the reaction is carried out in the presence of a foaming agent.

Generally for rigid foams, up to about 10 moles of hydroxyalkylation agent are reacted per mole of aromatic (preferably phenolic) hydroxyl, i.e., per mole of polyol. In the production of flexible foams, the desired ether chain length is dependent on the molecular weight of the condensation product, but will generally not exceed about 100 units of hydroxyalkylation agent per mole of aromatic hydroxyl, and usually does not exceed about 20 per mole of polyol.

In another aspect of the invention, phosphorous compounds are included in the composition to render them extremely fire-resistant. It is also within the scope of the invention to incorporate other hydroxyl-containing compositions in the polyurethane compositions of the invention.

As stated above, the novel oxyalkylated ortho-substituted polyol may be further reacted with reactants such as polyaromatic polyisocyanates in the presence of a conventional blowing agent to obtain a novel polyurethane foam. Additionally, prepolymers made with the above polyols of this invention and excess toluene diisocyanate, e.g., may be employed as novel moisture-cured or polyol-cured adhesives, castings or coatings. Compositions prepared with the aliphatic polyols of this invention in reaction with a drying oil and a polyisocyanate also may be used as a novel brush drying coating. They have a hydroxyl number of about 30 to 500, more usually in the range of about 200 to 400. The viscosity of the condensation product is in the range of about 15 Gardner seconds at about 60 degrees centigrade.

A large number of various organic diisocyanates may be used. They may be introduced into the reaction mixture as diisocyanates or first reacted as indicated above, to form a prepolymer which is a polyisocyanate. The aromatic diisocyanates are more reactive and less toxic than the aliphatic members, and are consequently preferred. The compounds which are at present most readily available commercially are 2,4-toluene diisocyanate, 2,6-toluene diisocyanate and mixtures thereof.

Other typical polyisocyanates include methylene-bis-(4-phenyl isocyanate); n-hexyl diisocyanates; 1,5-naphthalene diisocyanate; 1,3-cyclopentylene diisocyanate; p-phenylene diisocyanate; 2,4-6-tolylene triisocyanate; 4,4′4″-triphenylmethane triisocyanate. Higher isocyanates are provided by the liquid reaction products of (1) diisocyanates and (2) polyols for polyamines and the like. In addition, isothiocyanates and mixtures of isocyanates can be employed. Also contemplated are the many impure or crude polyisocyanates that are commercially available. Especially preferred for use in the invention are the polyaryl polyisocyanates having the following generalized formula:

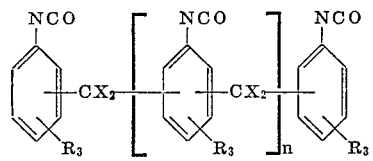

wherein $R_3$ is selected from the group consisting of hydrogen, chlorine, bromine, alkyl having 1 to 5 carbon atoms, and alkoxy having 1 to 5 carbon atoms; X is selected from the group consisting of hydrogen, alkyl having 1 to 10 carbon atoms and phenyl; and $n$ has an average value of at least 1 and generally about 1 to 3. The preferred composition of this type is polymethylene polyphenylisocyanate which is a mixture of compounds having the following generalized formula:

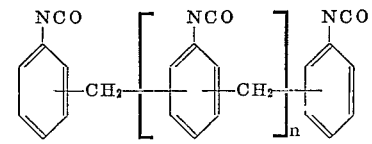

wherein $n$ has an average value of at least 1 and generally is from 1 to 3. Other typical compounds of this type include those wherein the $R_3$ groups are chlorine, bromine, methyl or methoxy, and wherein the value of X is methyl or phenyl in the generic formula.

Any foaming agent commonly used in the art can be employed. These are generally those materials that are capable of liberating gaseous products when heated, or when reacted with an isocyanate. Preferably, foaming is accomplished by introducing a low boiling liquid into the urethane components. The heat of reaction is then sufficient to expand the mixture to a foam stable enough to retain its shape until the polymer gels. Suitable liquids are the fluorochlorocarbons boiling in the range of −30 to 50 degrees centigrade and mixtures thereof, for example, trichlorofluoromethane, trichlorotrifluoroethane, difluoromonochloroethane and difluorodichloroethane. Also useful are mixtures of the fluorocarbons with chlorocarbons such as methylene chloride. Another class of foaming agents that is suitable for carrying out the foaming reaction at an elevated temperature is a tertiary alcohol in combination with a strong concentrated acid catalyst. Examples of tertiary alcohols include: tertiary amyl alcohol; tertiary butyl alcohol; and the like. Examples of catalysts include sulfuric acid and aluminum chloride. Other foaming agents that can be used include the following: polycarboxylic acids, polycarboxylic acid anhydrides, dimethylol ureas, polymethylol phenols, formic acid and tetrahydroxy methylphosphonium chloride.

If desired, a reaction catalyst can be employed in preparing the composition of the invention. Generally, but not necessarily, catalysts are employed to prepare the polyurethane foams having densities up to about 6 pounds per cubic foot. For foam products having densities of 6 pounds per cubic foot and higher, reaction catalysts are generally not needed. The catalysts employed can be any of the known conventional catalysts for isocyanate reactions, but the tertiary amines are preferred. Many such compounds are useful in the reaction, but they generally have up to 20 carbon atoms. Typical compounds of the trialkyl amines, such as trimethyl amine, triethyl amine, diethylene triamine, tetramethyl butane diamine and the like. Also suitable are the morpholine compounds such as N-methyl morpholine, N-acetyl morpholine, 4,4'-dithio morpholine, and the like; and the tertiary amine compounds have other functional groups such as diethyl ethanol amine, methyl diethanol amine, N-diethyl aminoacetic acid, methyl aminodiproprionic acid, N-methyl dipropylene triamine, dimethyl piperazine, and the like. The preferred amine compounds are triethyl amine and tetramethyl guanidine. Other urethane catalysts are also useful, for example: the antimony compounds, such as antimony caprylate, antimony naphthenate, and antimonous chloride; the tin compounds such as dibutyltin dilaurate, tri-n-octyltin oxide, hexabutylditin, tributyltin phosphate or stannic chloride.

The compositions of the invention comprising the reaction product of the condensation products and organic polyisocyanates have good fire-resistance. Thus, for example, polyurethane foams made of these compositions are rated "self-extinguishing" by the ASTM D-1692 Test Procedure. The compositions can be rendered even more fire-resistant, so that they can achieve a "non-burning" rating by the ASTM D-1692 Test by incorporating in the compositions various phosphorous compounds. Particularly suitable phosphorous compounds for this purpose have the following formula:

$$(R)_m-\overset{(O)_n}{\underset{}{P}}-(OR)_{3-m}$$

wherein $n$ is from 0 to 1, $m$ is from 0 to 3 when $n$ is 1, $m$ is from 0 to 2 when $n$ is 0, and R is selected from the group consisting of alkyl, halogen-substituted alkyl, aralkyl, alkylaryl, and aryl. The hydrocarbon radicals preferably contain from 1 to 20 carbon atoms. For any given compound, the value of R can be the same or different and compounds wherein the hydrocarbon radicals join to form a ring are also contemplated, such as phenyl ethylene phosphite. The alkyl groups can be substituted with a mixture of halogen atoms, such as mixtures of chlorine and bromine atoms. Typical phosphorous compounds that can be employed in accordance with the invention include the following compounds wherein R has the value defined hereinbefore:

Third degree esters of phosphoric acid (tertiary phosphates),

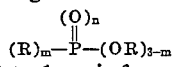

for example: trimethyl phosphate, triethyl phosphate, ethyl dimethyl phosphate, trilauryl phosphate, triphenyl phosphate, tricresyl phosphate, tribenzyl phosphate, phenyl ethylene phosphate, tris($\beta$-chloroethyl) phosphate, tris-parachlorophenyl phosphate, tris(2,3 - dichloropropyl) phosphate, and tris(2,3-dibromopropyl) phosphate.

Second degree esters of phosphonic acid (secondary phosphonates)

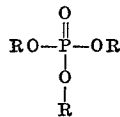

for example: dimethyl methylphosphonate, diamyl amylphosphonate, dilauryl methylphosphonates, diphenyl methylphosphonate, dibenzyl methylphosphonate, diphenyl cresylphosphonate, bis(chloropropyl)chloropropylphosphonate, bis(chloropropyl)propenyl - 2 - phosphonate, and bis(2,3dibromopropyl) 2,3-dibromopropyl phosphonate.

First degree esters of phosphinic acids (phosphinates)

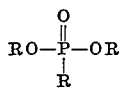

for example: methyl diethylphosphinate, benzyl diphenylphosphinate, methyl diphenylphosphinate, chloropropyl bis(chloropropyl)phosphinate, and butyl 2-bromoethyl phenyl phosphinate.

Tertiary phosphine oxides

for example, trimethyl phosphine oxide, triphenyl phosphine oxide, tribenzyl phosphine oxide, tris(chloropropyl) phosphine oxide, and 2-bromoethyl diphenyl phosphine oxide.

Third degree esters of phosphorous acid (tertiary phosphites)

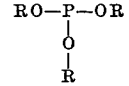

for example: triethyl phosphite, trilauryl phosphite, triphenyl phosphite, tribenzyl phosphite, phenyl ethylene phosphite, phenyl dimethyl phosphite, tris-parachlorophenyl phosphite, tris($\beta$-chloroethyl) phosphite, and tris-(2-bromoethyl) phosphite.

Second degree esters of phosphonous acids (secondary phosphonites)

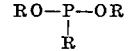

for example: dimethyl methylphosphonite, diphenyl methylphosphonite, dibenzyl methylphosphonite, dimethyl cresylphosphonite, bis(chloropropyl) chloropropyl phosphonite, and bis(bromopropyl) bromopropylphosphonite.

First degree esters of secondary phosphine oxides (phosphinites)

for example: methyl dimethylphosphinite, phenyl diphenylphosphinite, methyl diphenylphosphinite, chloropropyl bis(chloropropyl)phosphinite, and 2,3-dibromopropyl diphenylphosphinite.

The phosphorous acids can also be advantageously employed in the compositions of a preferred embodiment of the invention discussed above, in which the polyol sulfur linkage of the sulfur-linked polyols is substantially solely monosulfide.

The term "phosphorous acids" as used in describing the acidic phosphorous compounds of the invention include not only the mineral acids such as phosphoric acid and those acids having direct carbon-to-phosphorous bonds such as the phosphonic and phosphinic acids, but also those partially esterified phosphorous acids which contain at least one remaining unesterified acid group such as the first and second degree esters of phosphoric acid and the like.

Typical phosphorous acids that can be employed in the invention include the following compounds wherein R is as defined hereinbefore:

phosphoric acid,

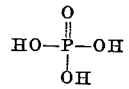

phosphorous acid,

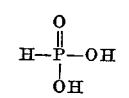

hypophosphorous acid,

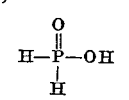

phosphonic acids,

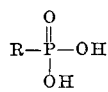

for example: methylphosphonic acid, hexylphosphonic acid, phenylphosphonic acid, tolylphosphonic acid, benzylphosphonic acid, and 2-phenylethylphosphonic acid;

phosphinic acids, (secondary phosphonic acid)

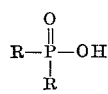

for example: dimethylphosphinic acid, methylhexylphosphinic acid, diphenylphosphinic acid, phenylnaphthylphosphinic acid, dibenzylphosphinic acid, methylphenylphosphinic acid, and bis(hydroxymethyl) phosphinic acid;

phosphonous acids,

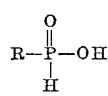

for example: ethylphosphonous acid, phenylphosphonous acid, tolylphosphonous acid, and benzylphosphonous acid, First degree esters of phosphoric acid (primary phosphates),

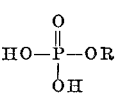

for example: methyl phosphoric acid, butyl phosphoric acid, 2-ethyl hexyl phosphoric acid, phenyl phosphoric acid, cresyl phosphoric acid, and benzyl phosphoric acid;

Second degree esters of phosphoric acid (secondary phosphates),

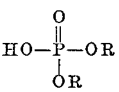

for example: dibenzyl phosphoric acid, dimethyl phosphoric acid, dibutyl phosphoric acid, di(2-ethylhexyl) phosphoric acid, diphenyl phosphoric acid, methyl phenyl phosphoric acid, and phenyl benzyl phosphoric acid;

First degree esters of phosphorous acid (primary phosphites)

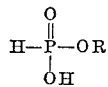

for example: methyl phosphorous acid, pentyl phosphorous acid, phenyl phosphorous acid, cresyl phosphorous acid, and benzyl phosphorous acid;

Second degree esters of phosphorous acid (secondary phosphites)

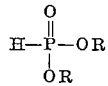

can be used with little more difficulty because they are weak acids, for example: dimethyl phosphorous acid (dimethyl phosphite), methyl butyl phosphorous acid, diphenyl phosphorous acid, phenyl benzyl phosphorous acid, dibenzyl phosphorous acid, and methyl phenyl phosphorous acid;

First degree esters of phosphonic acid (primary phosphonates),

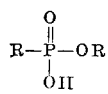

for example: ethyl methylphosphoric acid, methyl butyl phosphonic acid, phenyl phenylphosphonic acid, tolyl methylphosphonic acid, and ethyl benzylphosphonic acid;

First degree esters of phosphonous acid (primary phosphonites)

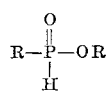

can be used with a little more difficulty because they are weak acids, for example: methyl ethylphosphonous acid, methyl phenylphosphonous acid, and phenyl phenylphosphonous acid.

Phosphorous compounds of the foregoing types wherein sulfur is substituted for the oxygen atoms can also be employed.

Another class of phosphorous compound useful with the condensation products of the invention in the preparation of polyurethane compositions are the compounds having the formula:

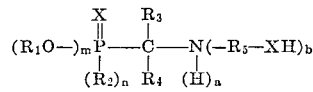

wherein $m$ and $n$ have a numerical value of zero through two, and $m+n$ equals two, $a$ has a value of zero or one, $b$ has a value of one or two, and $a+b$ equals two; X is oxygen or sulfur; $R_1$, $R_2$, $R_3$, and $R_4$ are organic radicals selected from the group consisting of alkyl, cycloalkyl, alkenyl, aryl, alkylaryl, arylalkyl, and halo-substituted organic radicals of the foregoing group; and $R_3$ and $R_4$ can also be hydrogen, and $R_5$ is an alkyl group.

Examples of the foregoing compounds are dimethyl-N-(2'-hydroxyethyl) - 2 - aminoisopropyl-2-phosphonate; dimethyl-N-(2'-hydroxyethyl)-2-aminoethyl-2 - phosphonate; dibutyl-N-bis(2'-hydroxyethyl) - 2 - aminoethyl-2-phosphonate; and dimethyl - N - bis(2' - hydroxyethyl)-aminomethyl-2-phosphonate.

Other useful phosphorous compounds that can be used in combination with the condensation products of the invention are the esters of phosphonic acid having the formula:

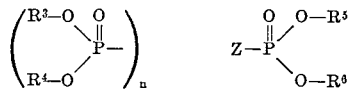

wherein Z is selected from the group consisting of alkyl, alkylene, alkenyl, aryl substituted alkyl, aryl, alkyl substituted aryl, nitroalkyl, halogen substituted aryl, heterocyclic, hydroxy substituted alkyl, hydroxy substituted alkylene, halogen substituted alkylene, substituted alkenyl, halogen substituted alkyl, hydroxy substituted aryl, hydroxy aryl substituted alkyl, hydroxy alkyl substituted aryl, hydroxy alkyl substituted heterocyclic, hydroxy alkoxy alkyl, hydroxy polyalkoxy alkyl and mixtures thereof, $R^3$, $R^4$, $R^5$ and $R^6$ are selected from the group consisting of alkyl, aryl, alkyl substituted aryl, aryl substituted alkyl, nitro alkyl, halogen substituted aryl, halogen substituted alkyl, hydroxy alkyl, alkoxyalkyl, hydroxy alkoxy alkyl, alkenyl, substituted alkenyl, hydroxy polyalkoxy alkyl, and mixtures thereof, $n$ is from 0 to 5 and the molecule contains from 3 to about 32 hydroxyls.

Examples of the foregoing esters of phosphonic acid are bis-(oxypropylated pentaerythritol) oxypropylated pentaerythritol phosphonate; bis-(trimethylol propane) trimethylolpropane phosphonate; bis-pentaerythritol butane phosphonate; and bis-trimethylol propane trichlorobenzyl chloride phosphonate. The preparation of these and other such compounds is disclosed in copending application S.N. 329,858, filed Dec. 11, 1963.

Also useful in combination with the condensation products of the invention are the esters of phosphonic acid having the formula:

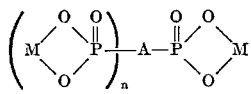

wherein M is the residue of a polyol wherein two hydroxyls are removed from a group of carbon atoms with hydroxyls attached thereto and one carbon atom between the two carbon atoms from which the hydroxyl groups have been removed, A is selected from the group consisting of an aliphatic and an aromatic radical, n is selected from 0 to 5 and the molecule has 2 to 32 hydroxyl groups.

Examples of the foregoing compounds are pentaerythritol butane phosphonate; bromodipentaerythritol decane phosphonate; chlorodipentaerythritol furfuryl phosphonate; and chloro - 1,1,1,3,3,3 - hexamethylol propanol-2-benzyl phosphonate. The preparation of these and other such compounds is disclosed in copending application S.N. 323,114, filed Nov. 12, 1963.

In preparing the polyurethane compositions of the invention, one or more of the sulfur condensation products of the invention can be employed in admixture, for example, a product based on phenol itself and a product based on nonyl phenol. In addition, admixtures of the sulfur condensation product of the invention with other hydroxyl-containing materials can be employed. Suitable auxiliary hydroxyl-containing polymeric materials generally have a hydroxyl number between about 30 and 950. Such auxiliary materials can be a polyester, a polyether, or mixtures thereof, commonly having a molecular weight in the range of 200 to about 4,000. Other auxiliary hydroxyl-containing materials are polyhydric alcohols having at least two, and preferably at least three hydroxyl groups. Suitable examples are listed hereinafter in the description of the polyesters.

The polyesters as auxiliary materials are the reaction products of a polyhydric alcohol and a polycarboxylic compound of the type defined above in the preparation of polyesters of the aromatic or phenolic polyols.

A portion of the total polyhydric alcohol component of the polyesters may comprise a polyhydric alcohol containing at least three hydroxyl groups. Suitable polyfunctional alcohols include ethylene glycol, diethylene glycol, propylene glycol, polypropylene glycols, polybutylene glycols, glycerol, hexanetriol, trimethylol propane, trimethylol ethane, mannitol, cyclohexanediol-1,4; glycerol monoethyl ether; 2,3 - dimethylol - 1,4,5,6,7,7-hexachlorobicyclo-(2.2.1) - 5 - heptene; 2,3-dimethylol-1,4,5,6-tetrachloro-7,7-difluorobicyclo-5-heptene; 2,3 - dimethylol-1,4,5,6-tetrachloro-7,7-difluorobicyclo - (2.2.1)-5-heptene; and the like. The ratio of the polyhydric alcohol to polybasic acid can be expressed as the hydroxyl-carboxyl ratio which can be defined as the number of moles of hydroxyl groups to the number of moles of carboxyl groups in a given weight of polyester. This ratio can be varied over a wide range. Generally, however, a hydroxyl-carboxyl ratio of between 1.5::1 to 5:1 is used.

Polyesters or polyethers that may be employed as auxiliary hydroxyl-containing polymeric materials are known in the art. Generally, they are the reaction products of (1) a polyhydric alcohol and a polycarboxylic acid or (2) either a polyhydric alcohol or a polyphenolic compound and an 1,2-epoxide or oxirane compound having a single 1,2-epoxy group, such as propylene oxide. The polyhydric alcohols, polycarboxylic acids, and mono-1,2-epoxides which can be employed are any of the polyhydric alcohols, polycarboxylic acids, and mono-1,2-epoxides enumerated hereinbefore. The polyphenolic compounds which can be used are the reaction products of aldehydes having, for example, 1 to 8 carbon atoms with phenols of the type described hereinbefore. A typical example is a phenolformaldehyde novolak resin.

Various additives can be incorporated in the polyurethane composition to modify the properties thereof. For example, the fire resistance of the composition can be further improved by the addition of an antimony compound. Fillers, such as clay, calcium sulfate, or ammonium phosphate can be added to lower the cost; components such as dyes can be added for color; and fibrous glass, asbestos, synthetic fibers can be added to improve strength characteristics. Surfactants are generally employed to control cell structure of foam products. Suitable cell controllers are the silicone-glycol copolymers, such as triethoxy dimethyl polysiloxane copolymerized with a dimethoxypolyethylene glycol.

In preparing the polyurethane compositions of the invention, the hydroxyl-containing components and the organic polyisocyanate are preferably reacted in a ratio sufficient to provide about 85 to 115 percent of isocyanate groups with respect to the total number of hydroxyl and carboxyl groups in the hydroxyl-containing polymeric material and the foaming agent. Various amounts of auxiliary hydroxyl-containing components can be employed, but generally the condensation products of the instant invention will comprise from 25 to 100 percent of the total hydroxyl-containing components of the composition. In the embodiments of the invention wherein phosphorous compounds are used in combination with the condensation products of the invention, the phosphorous compounds generally comprise from about 1 part up to about 20 parts by weight per 100 parts of the hydroxyl-containing components. The preferred amount of the phosphorous compound is from 2 to about 10 parts by weight per 100 parts of hydroxyl-containing component. It is generally preferred to add the phosphorous compounds directly to the hydroxyl-containing components to reduce viscosity, and subsequently to add the polyisocyanate and the foaming agent; however, excellent results are obtained when all the components are simultaneously mixed together. The reaction temperature generally ranges from about 20 to about 120 degrees centigrade, although higher and lower temperatures can be used. When polyurethane foam products are desired, the stream temperatures can be adjusted to provide the foamable composition in a pre-expanded or frothed condition, if desired.

The following examples serve to illustrate the invention. All parts are by weight and temperatures in degrees centigrade unless it is indicated otherwise.

Example I

A mixture of 1128 g. phenol (12 moles), 230.4 g. sulfur (7.2 moles), and 2.4 g. of sodium hydroxide, dissolved in 20 ml. of water is stirred and heated at 144–149° C. until 108 g. of hydrogen sulfide is liberated. This requires 27 hours. This quantity of hydrogen sulfide represents 44% of the charged sulfur. Upon stripping the reaction product at a reduced pressure of about 20 mm., up to 145° C., 647 g. of phenol is recovered, leaving a product residue of 627 g. Analysis of the residue discloses 21 percent sulfur and a molecular weight of 298. A portion of the 532 g. product residue is reacted with ethylene oxide for about two and two-thirds hours in a temperature range of about 135° C. to about 165° C. (predominantly about 135° C.) sufficiently to obtain a reaction product characterized by an analysis of about 12 percent sulfur, about 10 percent aliphatic hydroxy, a viscosity of about 18 Gardner seconds at about 60° C., and a mole weight of about 469(±5)%. The reaction product is reacted with an organo-polyisocyanate sufficiently to obtain a good quality polyurethane foam.

This example illustrates a typical embodiment of the process of this invention in the production of aliphatic polyol which contains less than about twenty percent of the sulfur-carbon bonds para, to the carbon-oxygen bonds of the aromatic rings. This example further illustrates a subsequent novel use of the ortho-product to produce a polyurethane therefrom.

Example II

In a reaction vessel, 6760 g. 72 moles of phenol, 1152 g. of sulfur (36 moles), and 8.4 g. of sodium hydroxide dissolved in 12 ml. of water are admixed and reacted for 13 hours in a temperature range of about 150° C. to about 187° C., sufficiently to give off about 580 g. of hydrogen sulfide. The reaction product is distilled at about 145° C./30 mm. to recover 4002 g. of phenol, and a residue of about 3336 g. containing 18.0 percent sulfur, and having a molecular weight of about 268. A portion of this residue, 3308 g. is reacted with ethylene oxide for about eight hours in the range of about 115° to about 139° C., sufficiently to obtain a product of 12.2% sulfur, 11% OH, and having a mole weight of about 388. This final polyol reaction-product is reacted with polyorganopolyisocyanate to obtain a good quality polyurethane foam.

This example illustrates the process for producing the intermediate ortho-polyol of this invention when employing a higher temperature of reaction for a shorter period of time in the reaction of elemental sulfur with the phenolic reactant, followed by the production of polyurethane foam.

Examples III through IX

Examples VI through XII were conducted substantially the same as the initial condensation reactions of the preceeding Example I, first step except that each was reacted for a period of twenty-seven hours. The reactants, the amounts thereof, the reaction temperature, and the percent of reaction which was obtained, are disclosed in the following Table I.

illustrated by the series of Examples VI through IX where the ratio of phenol to sulfur in the reaction charge is changed: increasing the ratio from 0.5 to 1.0 raises the extent of reaction from 32 to 61%. A further increase (at a different catalyst level) raises the extent of reaction from 72 to 86%.

Examples X through XVIII

Examples X through XVIII were each conducted substantially the same as Examples III through IX except for the changes disclosed in Table II.

Of the sulfide bonds, the monosulfide is the most stable. Polysulfide bonds can be split by nucleophilic reagents. The phenolsulfur condensation product when prepared for use as an intermediate orthopolyol of this invention for conversion to an aliphatic polyol or to an epoxy resin therefore, should contain primarily monosulfide bonds. Monothiodiphenol, however, cannot be normally reduced to mercaptophenol. Therefore, to obtain the maximum yield of mercaptophenol, a phenol-sulfur condensation product having substantially no monosulfide bonds should be used.

These two alternative ends can be achieved by employing particular but different reaction conditions. The average number of sulfur atoms per sulfur bond is shown in the following Examples X through XVIII, illustrated in Table II for phenol-sulfur condensation products made under several conditions but all in the presence of 0.125 mole percent of sodium hydroxide relative to phenol. It should be noted that the higher temperatures increase the yield of substantially mono-thio linkages. The phenol-sulfur condensation products usually contain unreacted sulfur. In general, the larger the percentage of sulfur in the product, the larger will be the quantity of free sulfur. In Example X where the ratio of sulfur atoms to sulfur

TABLE I.—PERCENT OF PHENOL-SULFUR REACTION AFTER TWENTY-SEVEN HOURS

| Example: | Catalyst | | | °C. | Mole Ratio, Phenol/ Sulfur | Ratio of Sulfur Atoms to Sulfur Bond | Percent of Reaction | Hydrogen Sulfide Percent of Charged Sulfur |
|---|---|---|---|---|---|---|---|---|
| | Mole Percent | Weight Percent | Formula | | | | | |
| III | 0.63 | 1.16 | Na₂S₄ | 155 | 0.45 | 4.3 | 38 | 19 |
| IV | 0.63 | 1.16 | Na₂S₄ | 170 | 0.44 | 2.9 | 51 | 26 |
| V | 0.125 | 0.053 | NaOH | 150 | 1.0 | 3.7 | 43 | 22 |
| VI | 0.5 | 0.213 | NaOH | 144-149 | 1.67 | 1.3 | 86 | 43 |
| VII | 0.5 | 0.213 | NaOH | 150 | 1.0 | 1.8 | 72 | 36 |
| VIII | 0.25 | 0.107 | NaOH | 150 | 1.0 | 2.3 | 61 | 31 |
| IX | 0.25 | 0.107 | NaOH | 155 | 0.5 | 5.2 | 32 | 16 |

Examples III and IX illustrate (1) that less than 33% H₂S evolution, based on the number of sulfur moles, obtains a ratio of sulfur atoms to sulfur bonds of two or more, whereas more than 33% (i.e., Examples VI and VII) obtains a ratio of sulfur atoms to sulfur bonds of less than two, and (2) also illustrate the greater effectiveness of NaOH as a catalyst as compared with Na₂S₄.

bonds is one, no free sulfur is present. On the other hand, in runs similar to Example XVIII, two or three sulfur atoms may be chemically uncombined. In general, the number of chemically-bound sulfur atoms per polysulfide bond will be less than the numbers listed in Tables I and II under the heading "Ratio of Sulfur Atoms to Sulfur Bonds."

TABLE II.—ATOMS OF SULFUR IN THE PHENOLIC POLYOL PER SULFUR LINKAGE (BOND) AT 0.125 MOLE PERCENT OF NaOH

| Example: | °C. | Hours of Reaction | Mole Ratio Phenol/ Sulfur | Ratio of Sulfur Atoms To Sulfur Bond | Hydrogen Sulfide Percent of Charged Sulfur | Percent of Reaction |
|---|---|---|---|---|---|---|
| X | 172-186 | 11 | 2.0 | 1.0 | 49 | 98 |
| XI | 150-181 | 9 | 2.0 | 1.4 | 40 | 80 |
| XII | 160 | 4 | 2.0 | 2.4 | 30 | 59 |
| XIII | 161 | 3.5 | 2.0 | 3.1 | 25 | 50 |
| XIV | 155 | 200 | 1.0 | 1.2 | 45 | 90 |
| XV | 155 | 27 | 1.0 | 2.6 | 28 | 56 |
| XVI | 155 | 12 | 1.0 | 3.4 | 23 | 45 |
| XVII | 155 | 6 | 1.0 | 4.6 | 18 | 35 |
| XVIII | 155 | 3 | 1.0 | 6.3 | 14 | 27 |

The effect of temperature is demonstrated by comparing Examples III and IV. Increasing the catalyst concentration will increase the reaction, as shown in Examples V and VII. The greater susceptibility of phenol as compared with the phenolic polyol to reaction with sulfur is The following Example XIX demonstrates the predominant ortho substitution in the phenolic polyol. The phenolic polyol may be converted, in this example, by reduction to a product which is primarily o-mercaptophenol.

Example XIX

Phenol and sulfur reaction—increased catalyst level.— A solution of 1800 g. (20 moles) of phenol, 640 g. (20 moles) of sulfur and 100 g. (2.5 moles) of sodium hydroxide is heated at 110–135° C. until about 271 g. (8.0 moles) of hydrogen sulfide is evolved. This requires about ten hours. The reaction mixture is neutralized with hydrochloric acid and then filtered to remove sodium chloride. The filtrate is stripped of aqueous phenol containing about 200 g. of water. The residue is hydrogenated at 125° C. over $Co_2S_3$ catalyst under about 2000 pounds of hydrogen pressure. This requires about 19 hours. The product is fractionally distilled to separate the mixture of o-mercaptophenol and p-mercaptophenol.

Example XX

A mixture of 7520 g. of phenol (80 moles), 1280 g. of sulfur flour (40 moles), about 9 g. of NaOH and 14 ml. of water is heated at reflux, at 160–183° C. for eight hours. Hydrogen sulfide, 624 g., is evolved. Phenol, 4536 g., is then stripped from the reaction mixture to a final temperature of 137° C. at 3.6 mm. Propylene oxide is added to the residue at 135° C. throughout a 12 hour period to give a product containing 11% sulfur and having a hydroxyl number of 327 (about 10% aliphatic hydroxyl).

This example illustrates the employment of propylene oxide as the alkylene oxide in the preparation of an aliphatic polyol.

Example XXI

An urethane foam is prepared by the following procedure: To a blend of 85 parts of the ortho-substituted aliphatic polyol intermediate of this invention, 15 parts of butyl acid phosphate, one part of a silicone surfactant-foam stabilizer is added, a solution of 88 parts of a low-viscosity polymethylene polyphenylisocyanate and 30 parts of trichlorofluoromethane. After rapidly mixing the mixture for about 30 seconds, the incipient foam is transferred into an open mold. The resulting foam is fine-celled and is "self-extinguishing" by the ASTM D-1692 Test.

Example XXII

To a blend of 82.5 parts of the ortho-substituted aliphatic polyol, intermediate, 10 parts of butyl acid phosphate, 5 parts of triethanolamine, 2.5 parts of ethylene glycol and one part of a silicon surfactant-foam stabilizer is added a mixture of 100 parts of polyisocyanate and 30 parts of trichlorofluoromethane. The mixture is rapidly mixed until the foaming reaction begins when it is quickly transferred into an open container. A cut specimen of the resulting foam, after one hour storage at about 90° C. at 100% humidity, lost 0.3% in weight and gained 0.4% in volume. A one-hour exposure to 120° temperature caused a cut specimen to lose 0.7% in weight and 0.7% in volume.

The trichlorofluoromethane (Freon) is included in the polyol side of a second batch of the above formulation. The reaction mixture is transformed into a foam in a foam machine equipped with a mixing head. The foam is "self-extinguishing." It has a density of 2.6 pound per cubic foot. The temperature at which its volume expanded 5 percent is 137°.

This example illustrates the making of a novel polyurethane containing a fire-retardant phosphorous compound.

Example XXIII

Reaction of chlorophenol and sulfur.—An equimolar solution of o-chlorophenol and sulfur containing about 3 mole percent of NaOH with respect to phenol, is heated 15 hours at 170–175. The extent of reaction as indicated by hydrogen sulfide evolution is 43%. However, only 19% of the chlorophenol reacts.

A similar experiment is conducted with p-chlorophenol. The data of these two experiments are compared with the corresponding results obtained with phenol in the following Table III.

TABLE III.—COMPARISON OF REACTIVITY OF PHENOL AND CHLOROPHENOLS

| Phenol | Catalyst | Mole Percent | Hours | ° C. | Percent Extent of Reaction | Percent Phenol Conversion |
|---|---|---|---|---|---|---|
| o-Chlorophenol | NaOH | 2.8 | 15 | 170–176 | 42.8 | 18.5 |
| p-Chlorophenol | NaSH | 2.3 | 25 | 155–185 | 38.2 | 19.3 |
| Unsubstituted phenol | NaOH | 0.13 | 10 | 155 | 42.8 | 45 |

At the same extent of reaction, 43%, almost 2½ times more phenol had been converted than o-chlorophenol. This demonstrates the much lower reactivity of the chlorophenols as compared with phenol. Indeed, it is questionable if the reaction with chlorophenol proceeds in the same manner as with the more reactive phenols.

The polyols of this invention, as previously fully described, have a low sulfur content and preferably have predominantly mono-sulfur linkages. The ortho-substituted polyols of this invention may properly be termed "oligols". Phenolic condensation products of this invention which may be used as reclaiming agents, or as stabilizers, or as tackifiers, typically include oligols of alkylated phenol or of alkylated naphthol.

For example, butadiene-styrene rubber tread scrap can be reclaimed by mixing and heating the scrap with alkyl phenol-sulfur condensation products of this invention, along with a swelling agent and a tackifier. The reclaim, when refined, is soft, smooth and uniform, has good stretch qualities, and has satisfactory tact.

The novel addition processes and reaction products thereof of this invention became reasonably practical only upon the discovery by the applicants of the novel process of this invention whereby a high concentration of at least more than about 60% of the ortho-polyol could reliably be obtained. As a result of the ortho-polyol structure as a skeleton for the subsequent addition products, it is to be expected that applicants' novel polyurethane, for example, will exhibit improved properties. Accordingly, the above examples and preceding disclosure, are not intended to limit this invention except to the extent that the importance of particular limitations are pointed out in the disclosure.

We claim:

1. Process for producing an aliphatic polyol, comprising reacting (a) elemental sulfur with (b) a phenolic compound to produce a phenolic polyol having at least about 60% of all sulfur linkages in an ortho position to the hydroxy substituents of said phenolic compound and having the structure:

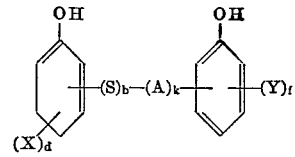

wherein A is a phenol-sulfide group of the formula:

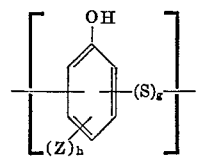

(c) in the presence of a basic catalyst at about 120° C. to about 200° C. until the number of moles of hydrogen sulfide evolved exceed about 33% of the number of moles of sulfur charged, and (d) reacting said phenolic polyol with an oxyalkylating agent wherein X, Y, and Z are selected from the group consisting of (a) halogen; (b) alkyl and alkoxy of 1 to 18 carbon atoms; (c) alkene of 2 to 18 carbon atoms; (d) aryl, aryloxy and aralkyl of 6 to 18 carbon atoms; and (e) hydroxy; $b$ and $g$ are 1 to about 7, provided that the average number of sulfur atoms per sulfur-linkage for the sum of all sulfur atoms of $b+(k$ times $g)$ equals less than two sulfur atoms per linkage; $k$ ranges from 0 to about 10; $d$ and $f$ range from 0 to 4; $h$ ranges from 0 to 3.

2. The process of claim 1 wherein the oxyalkylating agent is selected from the group consisting of ethylene carbonate and a compound containing an oxirane ring.

3. The process of claim 1 wherein said oxyalkylating agent is an alkylene lactone of from 3 to 6 carbon atoms.

4. The process of claim 1 wherein said oxyalkylating agent is a cyclic lower alkylene sulfite.

5. The process of claim 1 wherein the amount of phenolic reactant employed is from 0.8 to about 4 moles per mole of sulfur.

6. The process of claim 1 wherein the amount of basic catalyst employed ranges from a catalytic amount up to about 15% based on the amount of phenolic reactant.

7. The process of claim 6 wherein the basic catalyst is NaOH.

References Cited

UNITED STATES PATENTS

| | | | |
|---|---|---|---|
| 1,435,801 | 11/1922 | Blumfeldt | 260—48 |
| 2,629,743 | 2/1953 | Burnette et al. | 260—609 |

CHARLES B. PARKER, Primary Examiner

D. R. PHILLIPS, Assistant Examiner

U.S. Cl. X.R.

260—609, 348, 607, 858, 45.7, 484, 475, 485, 468, 77.5, 2.5, 75, 30.8, 961, 962, 963, 967; 204—158

PO-1050
(5/69)

UNITED STATES PATENT OFFICE
CERTIFICATE OF CORRECTION

Patent No. 3,494,966      Dated February 10, 1970

Inventor(s) Emil J. Geering et al.

It is certified that error appears in the above-identified patent and that said Letters Patent are hereby corrected as shown below:

Column 3, line 65, the formula should read

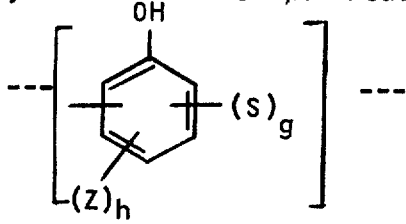

Column 9, line 2, delete "out temperatures", and insert --- out at temperatures ---.
Column 17, line 61, delete "1.5::1", and insert --- 1.5:1 ---.
Column 19, line 30, delete "preceeding" and insert --- preceding ---.
Co
Column 22, line 29, delete "prefereably" and insert --- preferably ---.
Column 22, line 65, Claim 1, insert bond in lower left of benzene ring.

SIGNED AND
SEALED

SEP 29 1970

(SEAL)
Attest:

Edward M. Fletcher, Jr.
Attesting Officer

WILLIAM E. SCHUYLER, JR.
Commissioner of Patents